(No Model.)  3 Sheets—Sheet 1.
W. R. DODSON.
STREET RAILWAY CAR.
No. 551,621.  Patented Dec. 17, 1895.
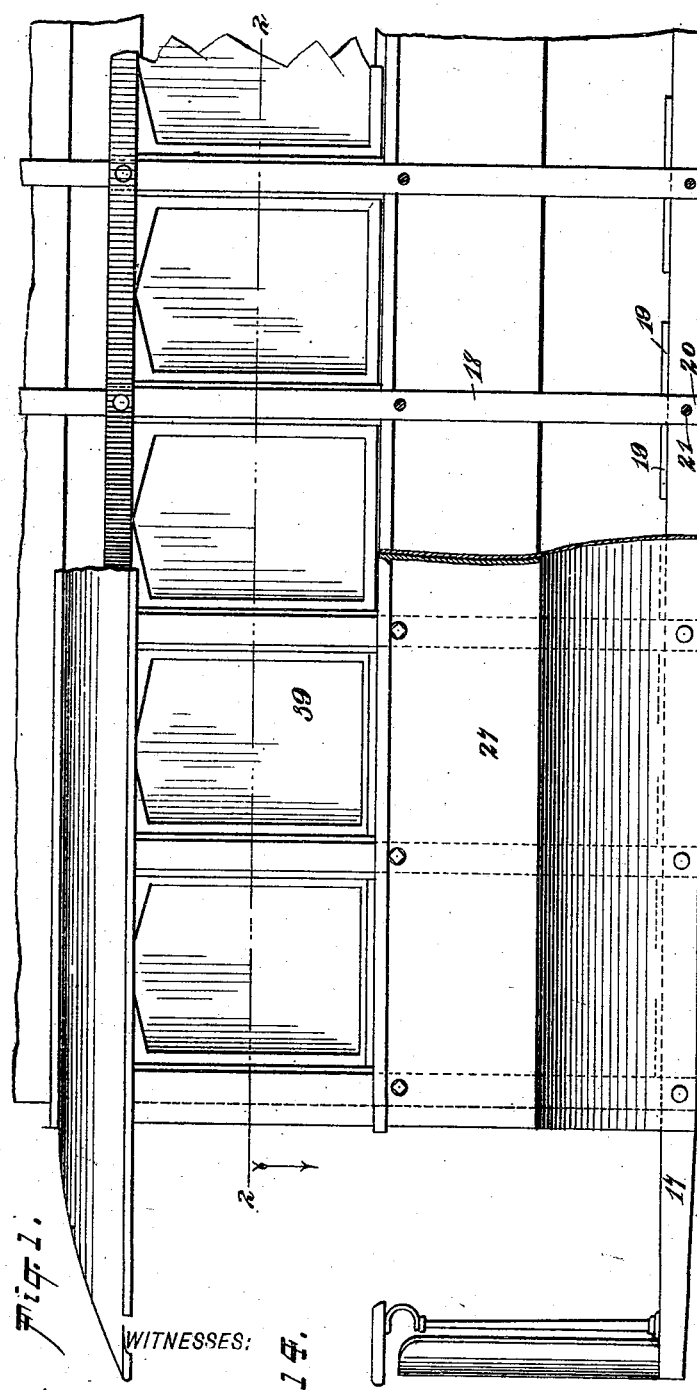
WITNESSES:
William P. Goebel
Isaac R. Owens
INVENTOR
W R Dodson
BY
Munn & Co
ATTORNEYS.

(No Model.)  
W. R. DODSON.  
STREET RAILWAY CAR.  
No. 551,621. Patented Dec. 17, 1895.
3 Sheets—Sheet 2.
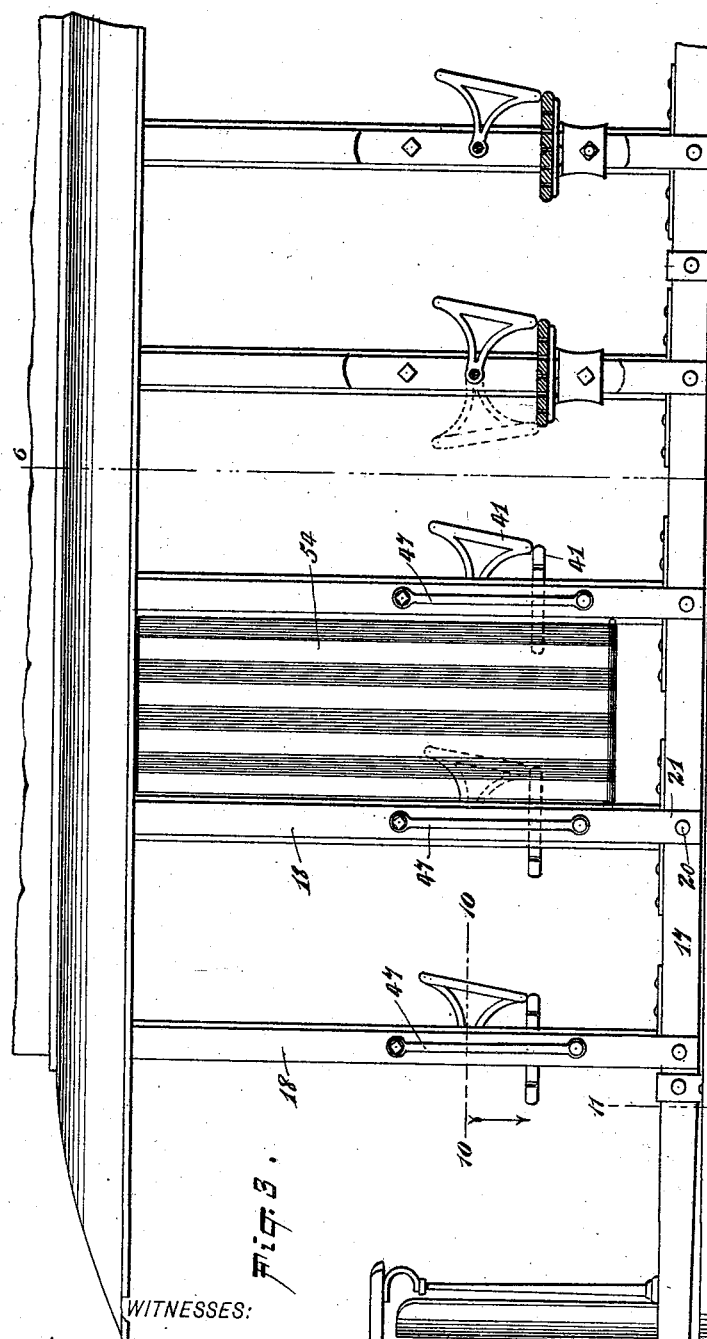
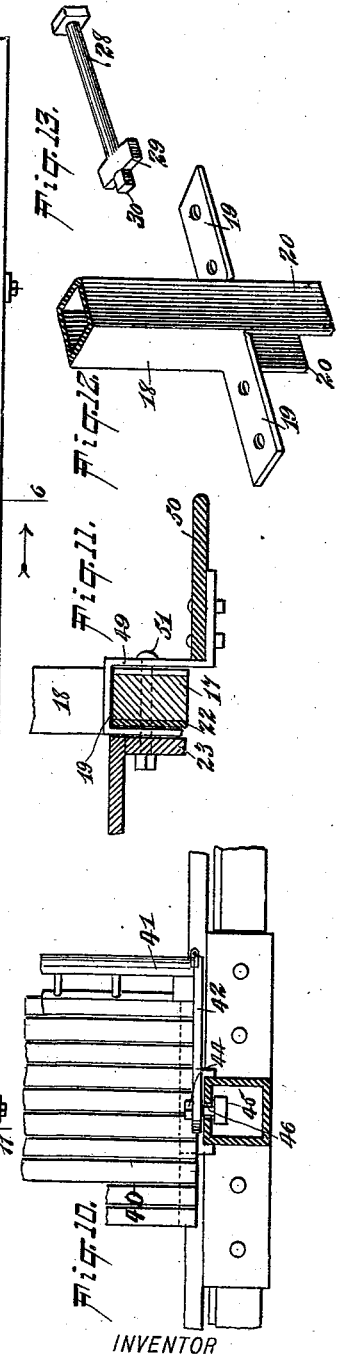
WITNESSES:
William P. Gaebel.
Isaac R. Owens.
INVENTOR
W. R. Dodson
BY
Munn & Co.
ATTORNEYS.

(No Model.) 3 Sheets—Sheet 3.
W. R. DODSON.
STREET RAILWAY CAR.
No. 551,621. Patented Dec. 17, 1895.
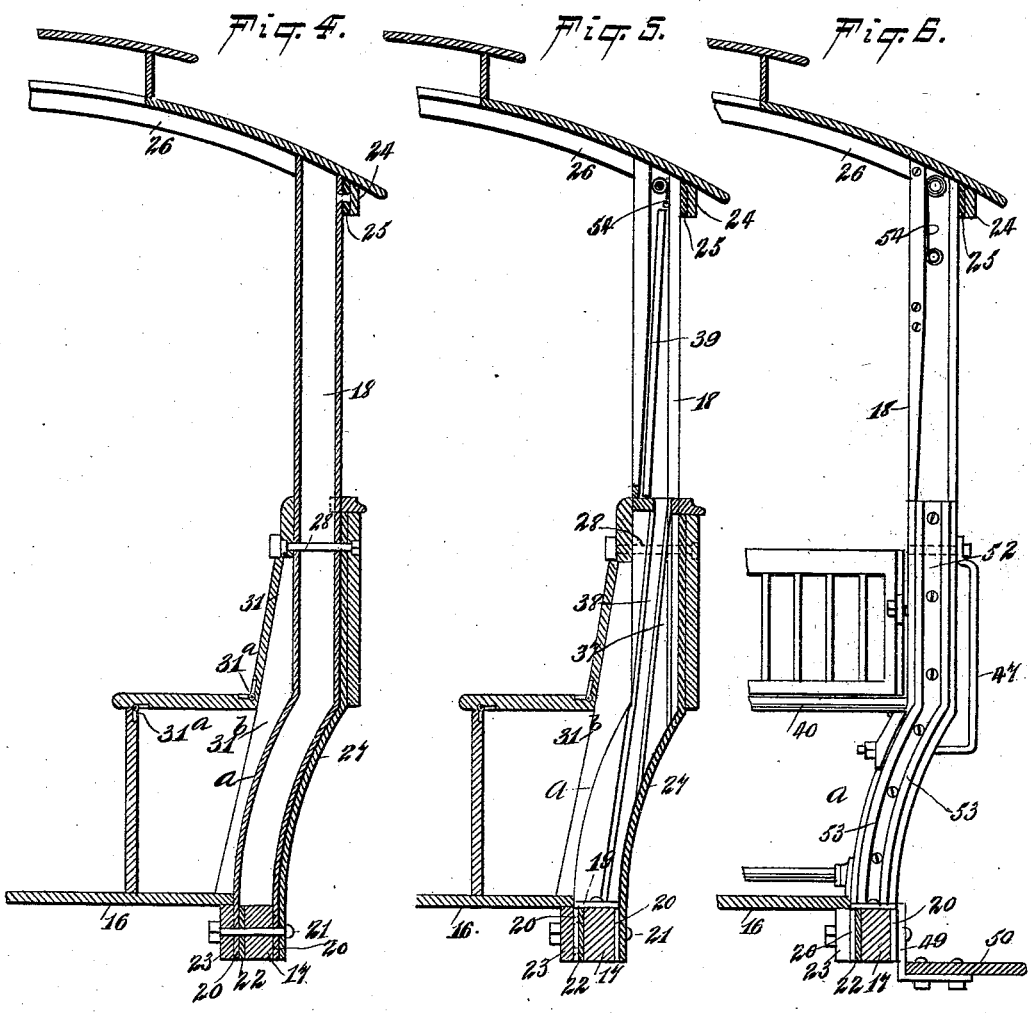
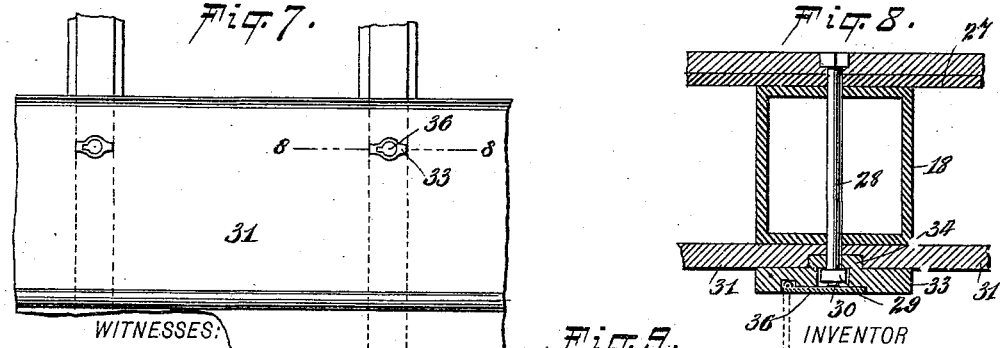
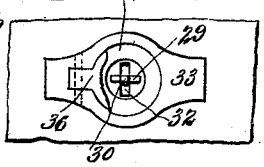
WITNESSES:
William P. Goebel.
Isaac B. Owens.
INVENTOR
W. R. Dodson
BY
Munn & Co
ATTORNEYS.

UNITED STATES PATENT OFFICE.

WILLARD R. DODSON, OF JERMYN, PENNSYLVANIA.

STREET-RAILWAY CAR.

SPECIFICATION forming part of Letters Patent No. 551,621, dated December 17, 1895.

Application filed August 7, 1895. Serial No. 558,537. (No model.)

*To all whom it may concern:*

Be it known that I, WILLARD R. DODSON, of Jermyn, in the county of Lackawanna and State of Pennsylvania, have invented a new and Improved Street-Railway Car, of which the following is a full, clear, and exact description.

The main object of this invention is to provide an improved street-car which will be capable of being transformed from a winter to a summer car, and in which this transformation may be readily and effectively attained.

Other objects are contemplated all tending to increase the general efficiency and durability of the car, and full attainment of all will be apparent hereinafter.

To these ends the invention consists principally in removable sides for the cars, which are provided with guides receiving the windows of the winter-car, so that the said windows may be moved into the auxiliary guides and the whole disconnected from the car.

The invention further consists in various combinations and features of construction, all of which will be further described hereinafter, and finally embodied in the claims.

Reference is to be had to the accompanying drawings, forming a part of this specification, in which similar characters of reference indicate corresponding parts in all the figures.

Figure 1 represents a side elevation of a portion of a street-car constructed after the manner of my invention and adjusted for use as a winter-car. Fig. 2 is a section on the line 2 2 of Fig. 1. Fig. 3 is a side elevation of a portion of the car, the parts being here shown as adjusted for summer use. Fig. 4 is a section on the line 4 4 of Fig. 2. Fig. 5 is a similar view on the line 5 5 of Fig. 2. Fig. 6 is a section on the line 6 6 of Fig. 3. Fig. 7 is a detail view showing a part of the seat in the winter-car. Fig. 8 is a section on the line 8 8 of Fig. 7. Fig. 9 is an enlarged front elevation of the locking-plate for the securing-bolt in Fig. 8. Fig. 10 is a section on the line 10 10 of Fig. 3. Fig. 11 is a section on the line 11 11 of Fig. 3. Fig. 12 is a detail perspective view of one of the columns in my invention. Fig. 13 is a similar view of one of the bolts for holding the sides of the winter-car. Fig. 14 is a detail section showing the door in the winter-car, and Fig. 15 is a detail perspective view illustrating a part hereinafter more fully described.

My improved car comprises a floor and its timbers 16, which may be of the usual construction and which has at its sides longitudinal girders 17. Mounted upon the girders 17 are columns 18, and these columns are arranged at equidistant points throughout the length of the girders, as best shown in Fig. 3. The columns are formed hollow and of any suitable material, and have their lower ends split to form longitudinally-aligned feet 19, which rest upon the upper faces of the girders 17, and transversely-aligned feet 20, which respectively embrace the sides of the girders and which are bolted in place by means of bolts 21, as best shown in Figs. 4 and 11. The feet 19 are also bolted to the respective girders 17 by means of bolts which pass vertically through the parts, as is shown in the drawings.

The columns 18 are each formed with a curved and inwardly-projected portion *a* at their lower ends, which gives the car the proper shape, all of which will be understood. Extending longitudinally with the girders 17 and at the inner sides thereof are the bracing-plates 22, which are bolted in place by means of the bolts 21 before described, and which have the respective beams 23 bolted at their inner sides by the same means. The purpose of this construction is to make the columns 18 perfectly rigid on the girders 17 and to prevent longitudinal displacement of the parts.

The upper ends of the columns 18 are connected to the longitudinal beams 24 by means of suitable bolts passing through them and through the plates 25, the said plates being interposed between the beams 24 and columns, as Figs. 4, 5, and 6 best illustrate. The purpose of the plates 25 is the same as that of the plates 22. The roof 26 is connected to the columns and to the beams 24 so as to be rigid thereon.

The above-described parts constitute the permanent frame of the car, and I will now describe the parts which are peculiar to the winter-car. These parts comprise the sides 27, which are shaped to conform to that of the columns 18, and which are bolted in place at their lower edges by means of the bolts 21 and at their upper edges by means of the bolts 28. The bolts 28 have their heads arranged outwardly and seated in countersunk recesses in the sides 27, while the inner ends of the bolts are provided with transversely-extending cross-bars 29, and longitudinally-extended portions 30 provided to permit the application of a wrench to the bolt. These bolts 28 are passed through the respective columns 18 and through the backs 31 of the winter seats, as shown in Figs. 4, 5, 7, and 8, and the bars 29 of the said bolts are projected through the vertically-disposed slots 32 in the blocks 33, the said blocks being formed with inwardly-extending projections 34 countersunk in the backs of the respective seats. When the bolts 28 are passed through the blocks 33 and seated within the annular recess 35 thereof, they are given a quarter-turn, so that their respective bars 29 will lie across the slots 32, and by these means the bolts will be locked in place. The blocks 33 are provided with swinging plates 36, which are hinged thereto and which may be moved to hide the inner ends of the bolts 28, as best shown in Figs. 7 and 8. The seat of the winter-car is hinged at two points 31ª, so that it may be folded when taken out and its size thus reduced, and these seats are supported by braces 31ᵇ lying alongside the columns 18.

The sides 27 are provided at their inner faces with inwardly-extended plates 37, which are formed with guideways or beads 38 adapted to receive the windows 39 of the winter-car. These guides or beads are arranged in pairs each adapted to embrace the respective columns 18, and to be aligned with the space between the window-beads at the upper end of the column, as best shown in Fig. 5. It will thus be seen that when it is desired to convert the car into a summer-car the windows 39 may be displaced from their guides at the upper parts of the columns 18 and moved downwardly into the guide ways 38 of the sides 27, whereupon the bolts 21 and 28 may be removed and the sides 27 displaced and substituted by devices which will now be described. These devices are best shown in Figs. 3, 6, and 10, and referring particularly to these views it will be seen that the seats 31 of the winter-car are substituted by the seats 40, which have the swinging backs 41 and the arms 49, which are hinged to the backs 41 by means of hinges 43, the said hinges being disposed so that the arms will be free to swing outwardly from the backs, and the arrangement of the parts should be such that the arms will be capable of springing inwardly to a slight degree and for a purpose which will be hereinafter described.

The seats 40 are rigidly supported on the columns 18 by means of blocks 40ª, which are hinged one to each end of the seats and lie against the inner sides of the respective columns 18, being held thereto by the lower ends of the handle-bars 47, which pass through the columns and through the blocks. The arms 42 of the seats are provided with rigid bolts 44, which project outwardly from the respective arms, which are formed with transversely-extending bars 45 at their outer ends, the said bars being adapted to pass through openings 46 formed in the columns 18, and these openings are elongated vertically, so that when the backs 41 are swung to an intermediary position and lie in a horizontal plane the bars 45 will register with the openings 46, and by springing the arms 42 inwardly to a slight degree the bolts 44 may be connected in a pivotal manner with the columns 18, and when the back is moved to either of its operative positions, as shown in full and dotted lines in Fig. 3, the cross-bars 45 will extend horizontally and be locked into the column.

The handle-bars 47 of the summer-car are one for each of the columns 18, and which have their upper ends secured to the columns by means of bolts passing through the same openings through which the bolts 28 pass in the winter-car, while the lower ends of the handle-bars are secured to the lower portions of the respective columns, as has been explained, by passing them through openings in the columns, and these openings are closed by the sides of the winter-car when said sides are in place. Held to each of the girders 17 by means of brackets 49 is the foot-step 50, which extends throughout the length of the car, and the brackets 49 comprise a U-shaped upper portion which embraces the girders 17 and is held in place by means of bolts 51, the said bolts being passed through the parts, as best shown in Fig. 11, and serving also to hold the beams 23 and plates 22 in place.

The adjacent sides of the columns 18 are provided in the summer-car with plates 52, which are screwed to the respective adjacent sides of the column and which carry parallel cleats 53, the said cleats being curved to conform to the shape of the plate 52, and the plate in turn being curved to conform to the shape of the column. These cleats 53 serve as a continuation of the guides for the windows at the upper parts of the columns 18, and in the summer-car these two guides are adapted to co-operate with the curtain 54, which is mounted as shown best in Fig. 6, and which has at its lower end the usual transverse bar sliding in the aforesaid guides. In the winter-car the same curtain-rollers may be used for curtains adapted to the winter-cars, as shown in Fig. 5.

I prefer to provide the doors of the winter-car with vertically-sliding windows 55, movable into a compartment 56 in the lower portion of the door 57, all of which will be understood without further description.

Having thus described my invention, I claim as new and desire to secure by Letters Patent—

1. In a car, the combination of longitudinal side girders, columns mounted thereon and each having a foot lying alongside the respective columns, and a plate rigidly secured alongside each girder and engaging the feet of the columns, substantially as described.

2. In a car, the combination of longitudinal girders, columns mounted thereon and each having a foot lying alongside of the respective girders, a plate for each girder and lying against the feet of the respective columns, and a beam rigidly secured against each plate, substantially as described.

3. In a car, vertical side columns, seats extending transversely from one to the other, backs for said seats, and bolts secured to the backs and provided each with a transverse bar capable of locking with the columns, substantially as described.

4. A car having vertical columns, seats extending transversely from one to the other, backs for the seats, arms hinged to the backs, and bolts carried by the arms and provided at their ends with cross bars, the columns having openings respectively receiving the bolts and adapted to hold the same locked therein, substantially as described.

5. In a railway car, the combination of a frame, of a seat, a locking bolt passed through the frame and having a transverse bar, a block secured to the seat and having the transverse bars of the bolt passed through it, and a plate hinged to the block and covering the said transverse bar, substantially as described.

6. In a street railway car, a frame, the same comprising two sets of vertical side columns, window guides, and two rigid sides removably held at the outer side of each set of columns, said sides being provided with inwardly projected portions having window guides aligning, when the sides are in place, with the window guides on the columns, substantially as described.

WILLARD R. DODSON.

Witnesses:
W. C. NICHOLSON,
WM. WALKER.